US012794167B2

(12) United States Patent
Sullivan

(10) Patent No.: US 12,794,167 B2
(45) Date of Patent: Nov. 10, 2026

(54) ELECTRICAL CONNECTOR AND SYSTEMS AND METHODS FOR FARMING AN ELECTRICAL CONNECTOR

(71) Applicant: NSI-LYNN ELECTRONICS, LLC, Huntersville, NC (US)

(72) Inventor: Robert W. Sullivan, Simi Valley, CA (US)

(73) Assignee: NSI-LYNN ELECTRONICS, LLC, Huntersville, NC (US)

( * ) Notice: Subject to any disclaimer, the term of this patent is extended or adjusted under 35 U.S.C. 154(b) by 505 days.

(21) Appl. No.: 18/238,452

(22) Filed: Aug. 25, 2023

(65) Prior Publication Data

US 2024/0097372 A1 Mar. 21, 2024

Related U.S. Application Data

(63) Continuation of application No. 17/313,950, filed on May 6, 2021, now Pat. No. 11,742,609, which is a (Continued)

(51) Int. Cl.
*H01R 13/46* (2006.01)
*H01R 24/28* (2011.01)

(Continued)

(52) U.S. Cl.
CPC ............. *H01R 13/46* (2013.01); *H01R 24/28* (2013.01); *H01R 24/64* (2013.01); *H01R 43/28* (2013.01); *H01R 2107/00* (2013.01)

(58) Field of Classification Search
CPC ........................................................ H01R 4/24

(Continued)

(56) References Cited

U.S. PATENT DOCUMENTS 3,274,530 A 9/1966 Michaely
3,569,900 A 3/1971 Uberbacker (Continued)

FOREIGN PATENT DOCUMENTS

CN 2418593 Y 2/2001
CN 2854844 Y 1/2007

(Continued)

OTHER PUBLICATIONS

Canadian Office Action for Application No. 2,893,156, dated Aug. 4, 2020, 5 pages.

(Continued)

*Primary Examiner* — Neil Abrams
(74) *Attorney, Agent, or Firm* — McCarter & English, LLP; David J. Silvia

(57) ABSTRACT

The present disclosure relates to a male electrical connector including a housing with a front end wall and an open rearward end opposite the front end wall. A plurality of openings extend through the front end wall. A plurality of slots are formed in the housing. Each slot is aligned with a respective opening of the plurality of openings and includes a contact blade positioned therein. A plurality of wires each extend though the open rearward end and a respective opening of the plurality of openings and engage a respective contact blade. The housing also includes a cutting surface connected to the front end wall below the plurality of openings. The cutting surface is configured to accommodate two opposing posts of a crimping and shearing tool positioned on opposite sides of the cutting surface in a cutting position. The posts extend the cutting surface in the cutting position.

17 Claims, 11 Drawing Sheets

Related U.S. Application Data continuation of application No. 16/792,704, filed on Feb. 17, 2020, now Pat. No. 11,146,014, which is a continuation of application No. 16/173,912, filed on Oct. 29, 2018, now Pat. No. 10,573,990, which is a continuation of application No. 15/375,013, filed on Dec. 9, 2016, now Pat. No. 10,116,082, which is a continuation of application No. 14/120,730, filed on Jun. 23, 2014, now Pat. No. 9,543,729.

(60) Provisional application No. 61/959,189, filed on Aug. 19, 2013.

(51) Int. Cl.
*H01R 24/64* (2011.01)
*H01R 43/28* (2006.01)
*H01R 107/00* (2006.01)

(58) Field of Classification Search
USPC .......................................................... 439/392
See application file for complete search history.

(56) References Cited

U.S. PATENT DOCUMENTS 3,998,514 A 12/1976 Hardesty
4,153,325 A 5/1979 Asick
4,219,913 A 9/1980 Johnson, Jr.
4,231,628 A 11/1980 Hughes et al.
4,444,447 A 4/1984 Markwardt
4,444,448 A 4/1984 Silbernagel et al.
4,954,098 A 9/1990 Hollingsworth et al.
4,964,812 A 10/1990 Siemon et al.
5,147,215 A 9/1992 Pritulsky
5,601,447 A 2/1997 Reed et al.
5,624,274 A 4/1997 Lin
5,772,465 A 6/1998 Hwang et al.
5,803,770 A 9/1998 Swendson et al.
5,830,005 A 11/1998 Watanabe
5,836,788 A 11/1998 Torii
5,906,503 A 5/1999 Wiencek et al.
5,996,224 A 12/1999 Sullivan
6,017,237 A * 1/2000 Sullivan ................. H01R 43/01 439/418
6,080,007 A 6/2000 Dupuis et al.
6,105,229 A 8/2000 Sullivan
6,116,943 A 9/2000 Ferrill et al.
6,123,572 A 9/2000 Ishii et al.
6,162,077 A 12/2000 Laes et al.
6,217,344 B1 4/2001 Saito et al.
6,238,231 B1 5/2001 Chapman et al.
6,276,954 B1 8/2001 Arnett et al.
6,371,775 B1 4/2002 Nakatsuka
6,402,559 B1 6/2002 Marowsky et al.
6,416,363 B1 7/2002 Sumiyoshi et al.
6,533,618 B1 3/2003 Aekins
6,663,436 B1 12/2003 Arnett et al.
6,729,899 B2 5/2004 Aekins et al.
6,729,901 B2 5/2004 Aekins
6,729,914 B2 5/2004 Jaouen
6,736,681 B2 5/2004 Arnett
6,746,283 B2 6/2004 Arnett et al.
6,764,333 B2 7/2004 Pocrass
6,783,402 B2 8/2004 Chen
6,821,142 B1 11/2004 Rayev et al.
6,837,738 B1 1/2005 Chen
6,840,816 B2 1/2005 Aekins
6,905,359 B2 6/2005 Perkins
6,953,363 B2 10/2005 Kameyama et al.
6,962,503 B2 11/2005 Aekins
7,168,992 B2 1/2007 Vo et al.
7,241,162 B1 7/2007 Lawrence
7,381,083 B2 6/2008 Amidon
7,415,760 B2 8/2008 Elias
7,731,521 B2 6/2010 Corradi et al.
7,857,635 B2 12/2010 Goodrich et al.
7,972,183 B1 7/2011 Lin
7,985,100 B2 7/2011 Jaouen et al.
7,985,101 B2 7/2011 Fitzpatrick
8,197,286 B2 6/2012 Larsen et al.
8,708,754 B2 4/2014 Su et al.
8,915,756 B2 12/2014 Schumacher et al.
8,992,247 B2 3/2015 Aekins
9,033,725 B2 5/2015 Fransen
9,054,460 B2 6/2015 Schumacher et al.
9,455,765 B2 9/2016 Schumacher et al.
9,543,729 B2 1/2017 Sullivan
9,720,181 B2 8/2017 Little et al.
10,116,082 B2 10/2018 Sullivan
10,573,990 B2 2/2020 Sullivan
11,146,014 B2 10/2021 Sullivan
11,742,609 B2 8/2023 Sullivan
2002/0142644 A1 10/2002 Aekins
2007/0113401 A1 5/2007 Elias
2008/0102686 A1 5/2008 Carreras Garcia et al.
2008/0313897 A1 12/2008 Elias
2010/0297870 A1 11/2010 Stephens et al.
2012/0282822 A1 11/2012 Elias
2013/0344722 A1 12/2013 Lloyd et al.
2024/0139756 A1 5/2024 Nieminen et al.

FOREIGN PATENT DOCUMENTS

CN 2896605 Y 5/2007
CN 201018150 Y 2/2008
CN 201199559 Y 2/2009
CN 102005681 A 4/2011
CN 202196954 U 4/2012
CN 102714361 A 10/2012
CN 104218371 A 12/2014
CN 104701664 A 6/2015
EP 0261285 A1 3/1988
EP 1875563 A1 1/2008
JP 6-28178 A 2/1994
TW 376594 B 12/1999
TW 506167 B 10/2002
TW 568403 U 12/2003
TW M408172 U 7/2011
WO 1986/001646 A1 3/1986
WO 1999/017406 A1 4/1999

OTHER PUBLICATIONS

Canadian Office Action for Application No. 2,893,156, dated Feb. 8, 2021, 3 pages.
Chinese Office Action for Application No. 201810109054.X, dated Feb. 15, 2019, 9 pages.
Chinese Office Action for Application No. 201710679180.4, dated Jun. 2, 2020, 2 pages.
Chinese Office Action for Application No. 201710679180.4, dated Nov. 30, 2018, 7 pages.
Office Action for Application No. 201810109054.X, dated Mar. 20, 2020, 14 pages.
Chinese Office Action for Application No. 201810109054.X, dated Sep. 12, 2019, 7 pages.
Chinese Office Action for Application No. 201910620325.2, dated Jan. 19, 2021, 4 pages.
Chinese Office Action for Application No. 201910620325.2, dated Jun. 1, 2021, 5 pages.
Chinese Office Action for Application No. 201910620325.2, dated Jun. 30, 2020, 4 pages.
European Office Action for Application No. 15200389.3, dated Jan. 30, 2019, 5 pages.
European Office Action for Application No. 15200389.3, dated Jun. 6, 2016, 9 pages.
European Office Action for Application No. 17186799.7, dated Nov. 28, 2018, 8 pages.
Taiwan Office Action for Application No. 104109823, dated Mar. 2, 2017, 6 pages.

(56) References Cited

OTHER PUBLICATIONS

Taiwan Office Action for Application No. 106141231, dated May 25, 2018, 3 pages.
Taiwan Office Action for Application No. 107136349, dated Jun. 20, 2020, 1 page.
Taiwan Office Action for Application No. 107136349, dated Jun. 22, 2020, 4 pages.
Taiwan Office Action for Application No. 107136349, dated May 8, 2019, 1 page.
Taiwan Office Action for Application No. 107136349, dated May 9, 2019, 6 pages.
Taiwan Office Action for Application No. 10713649, dated May 8, 2019, 1 page.
Taiwan Office Action for Application No. 10713649, dated May 9, 2019, 6 pages.
Taiwan Office Action for Application No. 108105309, dated Feb. 18, 2021, 20 pages.
Taiwan Office Action for Application No. 110100284, dated Feb. 25, 2021, 20 pages.
Taiwan Office Action for Application No. 110115944, dated Sep. 13, 2021, 2 pages.
Taiwan Office Action for Application No. 110136697, dated Dec. 29, 2021, 3 pages.

* cited by examiner

ELECTRICAL CONNECTOR AND SYSTEMS AND METHODS FOR FARMING AN ELECTRICAL CONNECTOR

This application is a continuation of U.S. Nonprovisional patent application Ser. No. 17/313,950, filed May 6, 2021, issued as U.S. Pat. No. 11,742,609, which is herein incorporated by reference in its entirety, which is a continuation of U.S. Nonprovisional patent application Ser. No. 16/792,704, filed Feb. 17, 2020, issued as U.S. Pat. No. 11,146,014, which is herein incorporated by reference in its entirety, which is a continuation of U.S. Nonprovisional patent application Ser. No. 16/173,912, filed Oct. 29, 2018, issued as U.S. Pat. No. 10,573,990, which is herein incorporated by reference in its entirety, which is a continuation of U.S. Nonprovisional patent application Ser. No. 15/375,013, filed Dec. 9, 2016, issued as U.S. Pat. No. 10,116,082, which is herein incorporated by reference in its entirety, which is a continuation of U.S. Nonprovisional patent application Ser. No. 14/120,730, filed Jun. 23, 2014, issued as U.S. Pat. No. 9,543,729, which is herein incorporated by reference in its entirety, which claims the benefit of U.S. Provisional Patent Application Ser. No. 61/959,189, filed Aug. 19, 2013.

PRIOR ART

This application describes and claims improvements over the inventions shown in my previously issued U.S. Pat. No. 6,017,237, as well as U.S. Pat. Nos. 5,996,224 and 6,105,229. The product patented there is a male type RJ45 connector, into which eight wires from a cable are inserted, and associated crimping and shearing tool. When the connector housing is crimped to secure the internal position of the wires, its internally contained electrical contact blades also assume the positions in which they will matingly engage the blades of corresponding contacts in the receptacle of an associated female RJ45 connector. For more than the past decade the eight-wire connector system disclosed in my referenced patents has been sold under my trademark EZ-RJ45 and used in Ethernet cable systems throughout the world. The uniqueness and novelty of these items has not been challenged.

One important feature of the inventions shown in those patents is that the wires are arranged inside the connector in such a way as to minimize interference or cross-talk between data streams being transmitted on respective wire pairs. Another important feature is the method in which color-coded wires inserted into the connector are allowed to protrude out from its front end so that a technician may view the color coded wires to verify their correct relative positions before shearing off their protruding ends. A further feature of those inventions is the arrangement of the connector assembly and its associated crimping and shearing tool such that the driven engagement of metallic contacts into the wires inside the connector housing, and the shearing and cutting off of the protruding wire ends, is done concurrently with the crimping of the plastic connector to secure the wires in their places inside the connector.

As electrical components for high-speed data transmission are made smaller and smaller, the data rates, packets, frequencies, and speed increase, and the corresponding wires get larger and larger, it has become necessary to establish rigorous standards to ensure their proper performance. Precise configurations and dimensions are required by FCC regulations and other industry standards. A connector housing must be made of a moldable injected material which is sufficiently moldable and deformable, such as GE Lexan material, to capture and retain the wires inside it. At the same time, the housing must have sufficient rigidity to reliably support the wires and their associated contact blades in precisely correct positions, in order to mate with associated contact elements in the receptacle of a female RJ45 connector. A further requirement is that the moldable material utilized must meet a fire safety standard of the Underwriters Laboratory and other international physical, electrical, quality and performance testing standards.

Drawings of my previous patents show many important details of my EZ-RJ45 connector as it has been and is presently being sold, those figures being identical in all three of my three prior patents. For convenient reference, certain figures of my prior patents are reproduced here as follows:

| This Application | Pat. No. 6,017,237 |
|---|---|
| FIG. 1 | FIG. 8 |
| FIG. 2 | FIG. 9 |
| FIG. 3 | FIG. 5 |
| FIG. 4 | FIG. 6 |

There are also other important details shown in drawings of my prior patent that are not fully replicated here, but understood.

Connector 20 as shown in FIG. 5 of my prior patents (reproduced here as FIG. 3) has an elongated hollow plastic housing 22. Insulated wires 16 enter its open rearward end 24 and extend in guided pathways inside and through the housing. Within the housing metal contact plates 36 having sharpened lower ends are poised to pierce the insulation of and make firm electrical contact with corresponding wires. The upper jaw 50 of an associated crimping and shearing tool has a downward protrusion 56 that will drive the metal contact plates 36 down into the correct position for their forward edges to matingly engage corresponding contacts, not shown, in the receptacle of the female RJ45 connector. The ends of wires 16 will not engage any contacts in female receptacle.

As shown in FIG. 4 of this application [FIG. 6 of my prior patents] the crimping and shearing tool has a lower jaw 70 which provides support underneath the housing 22 during a crimping and shearing operation. FIGS. 1 and 2 of this application show a control tab 30 which extends lengthwise underneath the housing 22. The forward end of control tab 30 must meet shape and dimension standards prescribed by FCC standards in order to correctly position the connector within the receptacle of a female connector (not shown). The outer end portion of the control tab 30 also provides a small anvil 42 at the forward end of housing 22 against which six of the protruding wire ends are sheared and cut when the crimping and shearing tool 50 is pressed downward.

In my EZ-RJ45 as shown in my previous patents the front end wall of housing 22 is largely closed but has openings 44 for the eight wires to protrude. There are also slots or grooves in the front end wall that are partially occupied by the contact blades 36, but the lateral edges of the blades 36 at the forward end of the housing do not extend to the front face of the housing. Instead, they are recessed back from the front end surface. This is necessary to allow the contact blades of a female receptacle (not shown) to be guided into those slots or grooves for making face-to-face contact with the lateral edges of contact blades 36. The mating contacts of the female receptacle (not shown) are protruding contact blades which will enter those slots or grooves to complete the electrical circuitry of the connector. The bared ends of wires 16 after they are cut do not engage any contacts in the female connector.

When tool 50, 70, is actuated for the crimping and shearing operation its cutting blade 60 wipes the front end of housing 22. In my EZ-RJ45 connector as shown in my prior patents six of the eight protruding wires 16—wires numbers 2 through 7—are freely floating over the anvil 42 and are reliably cut off in concert by the crimping and shearing tool 50, 70. The reason for this is that the connector control tab 30 must have exactly correct dimensions in order to precisely fit within a receptacle whose shape and dimensions are prescribed by an FCC or industry standard. The control tab 30 is wide enough to provide a supporting anvil only for wires 2-7. It has therefore been a practice in the field for the technicians using my EZ-RJ45 system to finish cutting off the ends of wires 1 and 8 by hand, after the connector housing has been crimped and the other wires have already been cut off. The wires used in my EZ-RJ45 connector are typically of the AWG size 24 in CAT 5 cable, with a proven data transmission rate per respective standards.

As shown in my prior patents, openings 44 through which the eight wires 16 will protrude are in a lower portion of the forward end face of housing 22. The slots or grooves for the contact blades are in the upper area of the front end wall of connector housing 22, and there is a vertical separation between the horizontal row of openings 44 for the wires and the slots or grooves for the contact blades 36.

PRIOR ART also includes Taiwan Patent No. CN2854844Y, U.S. Pat. No. 5,601,447 issued in 1997, and U.S. Pat. No. 6,905,359 issued in 2005.

BACKGROUND OF THE PRESENT INVENTION

It is necessary for the contact blades, not shown, of a female RJ45 connector to precisely mate with the forward edges of contact blades 36. The field experience and complaints with my EZ-RJ45 connector system have shown a need for improved performance. The operation of the shearing and crimping tool 50, 70, often tends to cause a distortion in the plastic housing 22, so that the wires and contacts are not maintained precisely in their desired dimensionally stable positions. There are several different forces that contribute to this result:

1. sliding contact force overcoming friction for seating blades 36;
2. insulation displacement force IDC. This is the force it takes to push the gold connector contact blades 36 into the wire insulation plastic coating and mate with the copper wires;
3. cut wire force—the shearing force needed to cut the wires 2-7;
4. any dullness of the cutting blade exacerbates the problem; and
5. since the blade 60 as shown in my prior patents is free-floating, any misalignment of the blade also exacerbates the problem.

All of these forces tend to push, twist, and deform the connector housing in an undesired manner. This may lead to an FCC non-compliant connector that has to be discarded, causing loss of time and money.

Since my present product requires hand cutting of wires 1 and 8, it would also be desirable to have all eight of the wires cut and sheared by the crimping and shearing tool, to avoid an extra hand working step by the technician.

SUMMARY OF THE PRESENT INVENTION

The first main concept of my present invention is using wires having thicker insulation, of AWG size 23, and keeping each twisted pair in its twisted state as close as possible to the pair of metal contacts that will conductively engage its respective wires, in order to improve the electrical performance and data transmission rate of the connector.

A second main concept of my invention is to provide a thickened front end wall (External Load Bar, or Stiffener). The outer dimensions of the connector housing must be limited to comply with legal and industry standards, and the larger wires necessarily require a reduction in the amount of plastic material forming the connector housing. The External Load Bar (or Stiffener) mechanically supports both the connector housing and the wires it contains, and is then sheared off along with the protruding wire ends in order to allow the male connector to properly mate with an associated female connector.

A third main feature of my present invention is a method which not only allows the outer ends of the protruding wire pairs to project from the front of the connector for color comparison purposes, but also allows the wires to be pulled and tightened in their still-twisted condition and brought as close as possible to their respectively associated contact blades before being sheared off. This method helps to improve the quality of electrical performance and to increase the data transmission rate.

According to my present invention, holes for the protruding wires, as well as slots or grooves for the contact blades, are provided in the thickened front end wall in generally the same way as shown in my prior parents. However, the thickened portion of the front wall (External Load Bar), which does include the area where the horizontal openings for the protruding wires are formed, does not include the slots or grooves that will receive the contact blades of a female receptacle.

When the modified crimping and shearing tool of my new invention cuts off the protruding ends of the wires it simultaneously shears off the unwanted thickness of the front end wall (External Load Bar or Stiffener). The Stiffener or Load Bar is formed INTEGRAL WITH the forward end wall of the housing. Therefore, when the blade acts to cut off the STIFFENER or LOAD BAR, that Stiffener or Load Bar continues to provide a stabilizing support for the front end wall of the housing UNTIL THE ACTION OF THE CUTTING BLADE IS FULLY COMPLETED and the Stiffener or load Bar has become fully severed from the connector housing.

With this thickened or stiffener portion of the front end wall, the housing 22 better supports both the wires, and the slots or grooves for receiving the contacts blades, before, during, and after the wires are cut off.

Thus in shearing off the exposed ends of the wires, I now at the same time cut off the thickened or stiffener part of the end wall, still leaving a thin front end wall for the connector housing that is sufficient to maintain the correct spatial locations of both the wires 16 and the contact blades 36. The connector then fits correctly within its allotted space in an associated female receptacle or terminal board.

In other words, by thickening the front end wall of housing 22, I now make the connector initially too long to fit within its prescribed space in a receptacle or panel board. But by cutting off the excess thickness of the front wall while the connector housing is being crimped and the contacts 36 are being forced into their conductive engagement with the associated wires 16, I reduce the connector housing length so that it does correctly fit, and also improves the end result of correctly terminating the connector.

I provide horizontal guideways inside the connector housing 22 to permit two horizontal rows of four wires each, in a staggered relationship, to be inserted into and through the connector. The holes or openings in the front end wall of housing 22 are then in two separate rows, four in each row. Adjacent holes then tend to slightly overlap or merge into each other.

Another and related feature of my present invention is modifying the crimping and shearing tool so that it very positively cuts off all the protruding wire ends concurrent with the crimping operation. I accomplish this by adding a pair of short posts 71 to the lateral ends of the lower jaw 70 of the crimping tool 50, 70 (see FIG. 11). These posts 71 together with the control tab 30 then provide an expanded and adequate anvil surface 42 for cutting off all of the wire ends that are encased in plastic; first the four in the upper horizontal row, then the four in the lower horizontal row.

A still further feature of the present invention is that I also provide a set of guides to control downward movement of the cutting blade, and a groove 102 extending laterally across the upper surface of the External Load Bar adjacent to the front wall of the connector housing, to guide the edge of cutting blade 60 when the blade is pushed down in its cutting action.

The objective of these improvements is to provide a connector that is suitable for use with CAT 6, CAT 6A and other ethernet cables and future larger wires and standards, in order to reliably operate at a data transmission rate of ten gigahertz and future transmission rates and applications.

DRAWING SUMMARY

Figure 9:
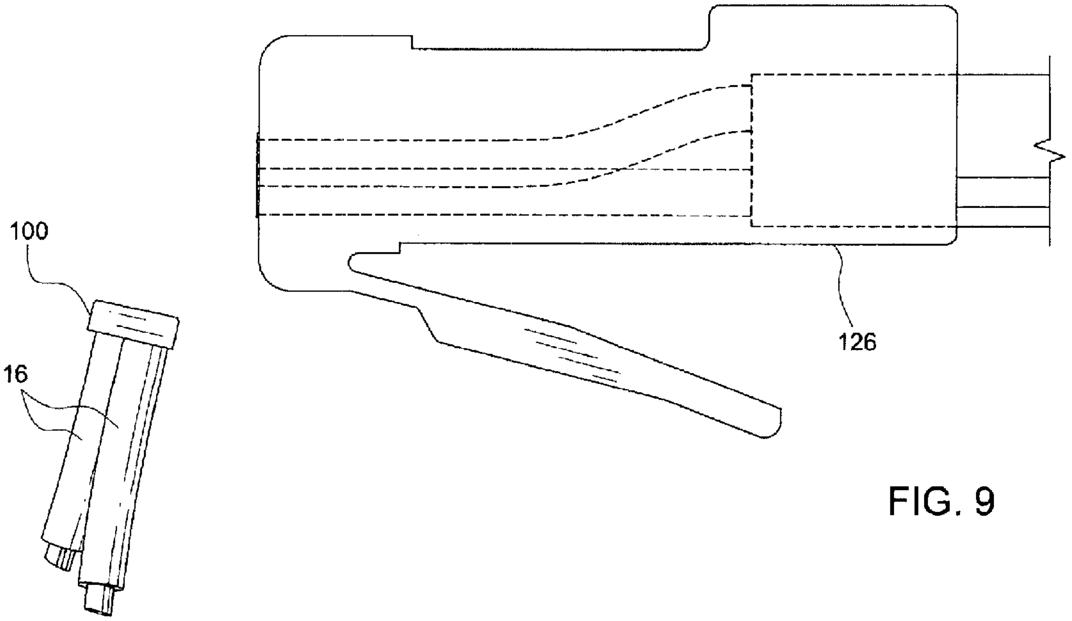
Figure 10:
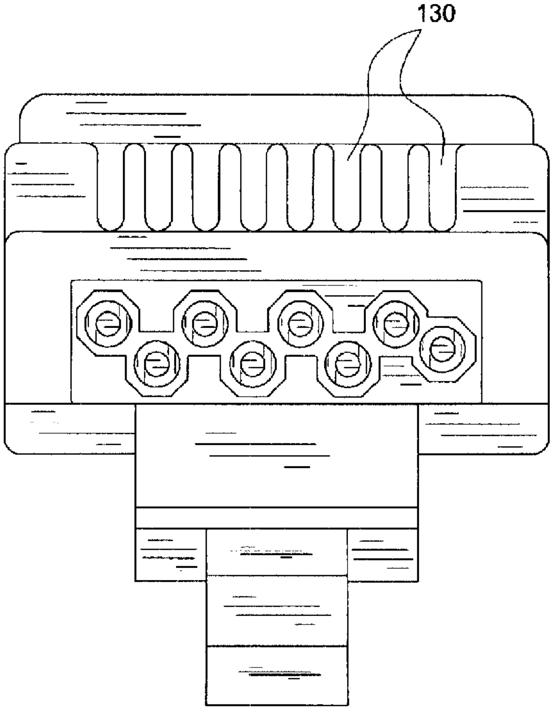

FIG. 9 is a side elevational view showing the External Load Bar after it has been separated from the connector housing, and still retains its accompanying load of the insulated wires which still remain encased in it and protrude from it; and FIG. 10 is a front end elevation of the loaded connector housing after the External Load Bar has been shorn off, exposing the bare ends of the insulated wires.

Figure 11:
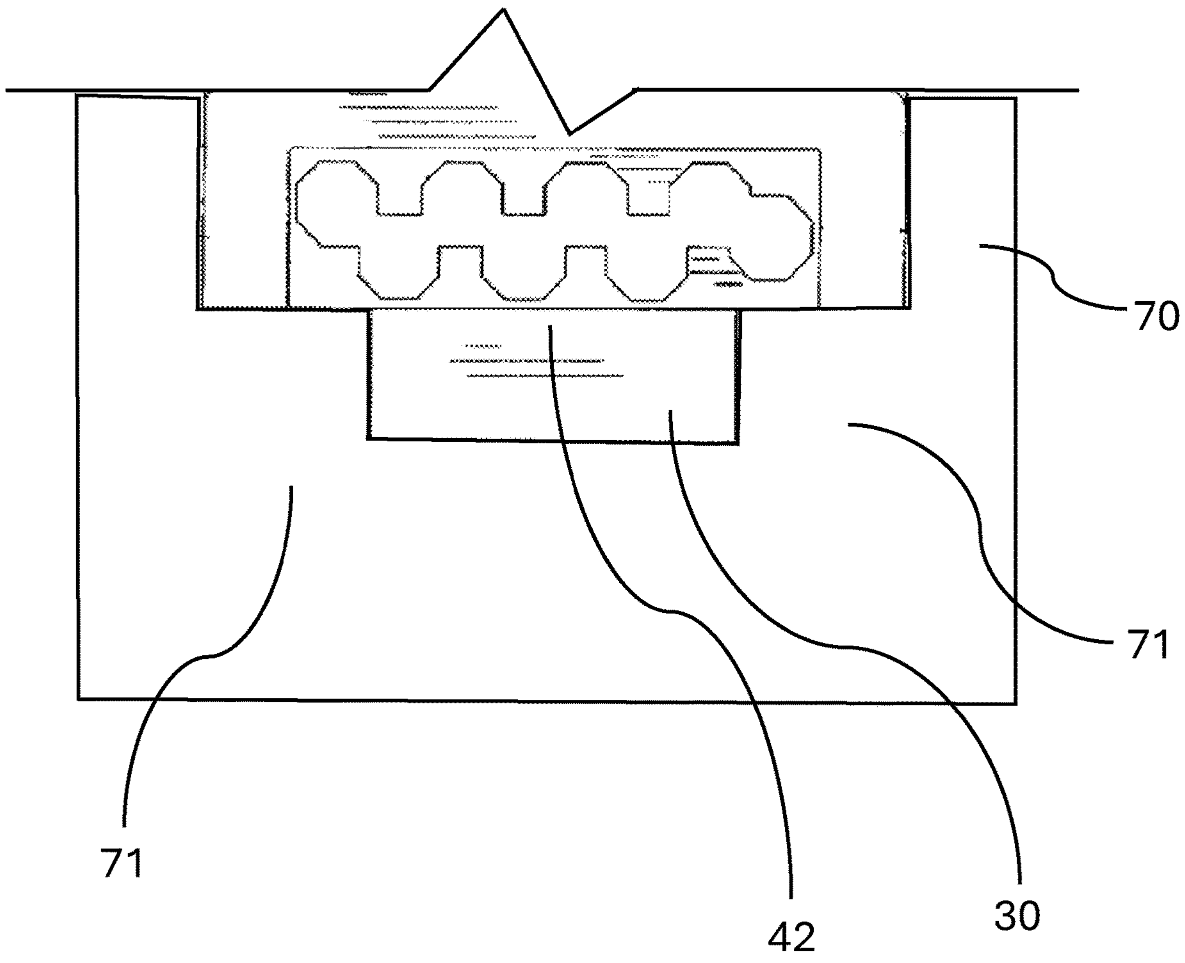

FIG. 11 is a front end elevation of the connector housing seated in a lower jaw.

DETAILED DESCRIPTION

Figure 1:
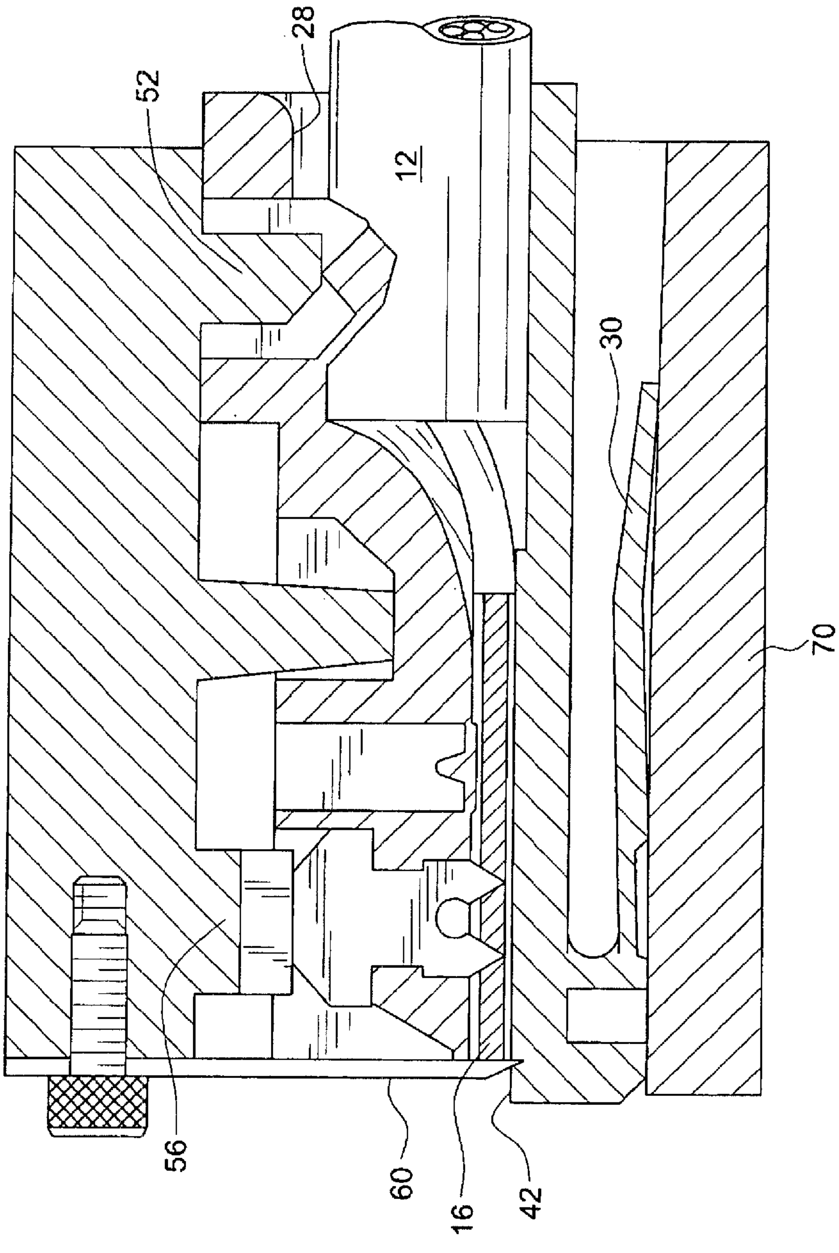
FIG. 1 Prior Art
FIGS. 1 through 4 are provided as exact copies of certain figures in my prior patents, which is necessary in order to provide a proper basis for describing my present invention.
Figure 2:
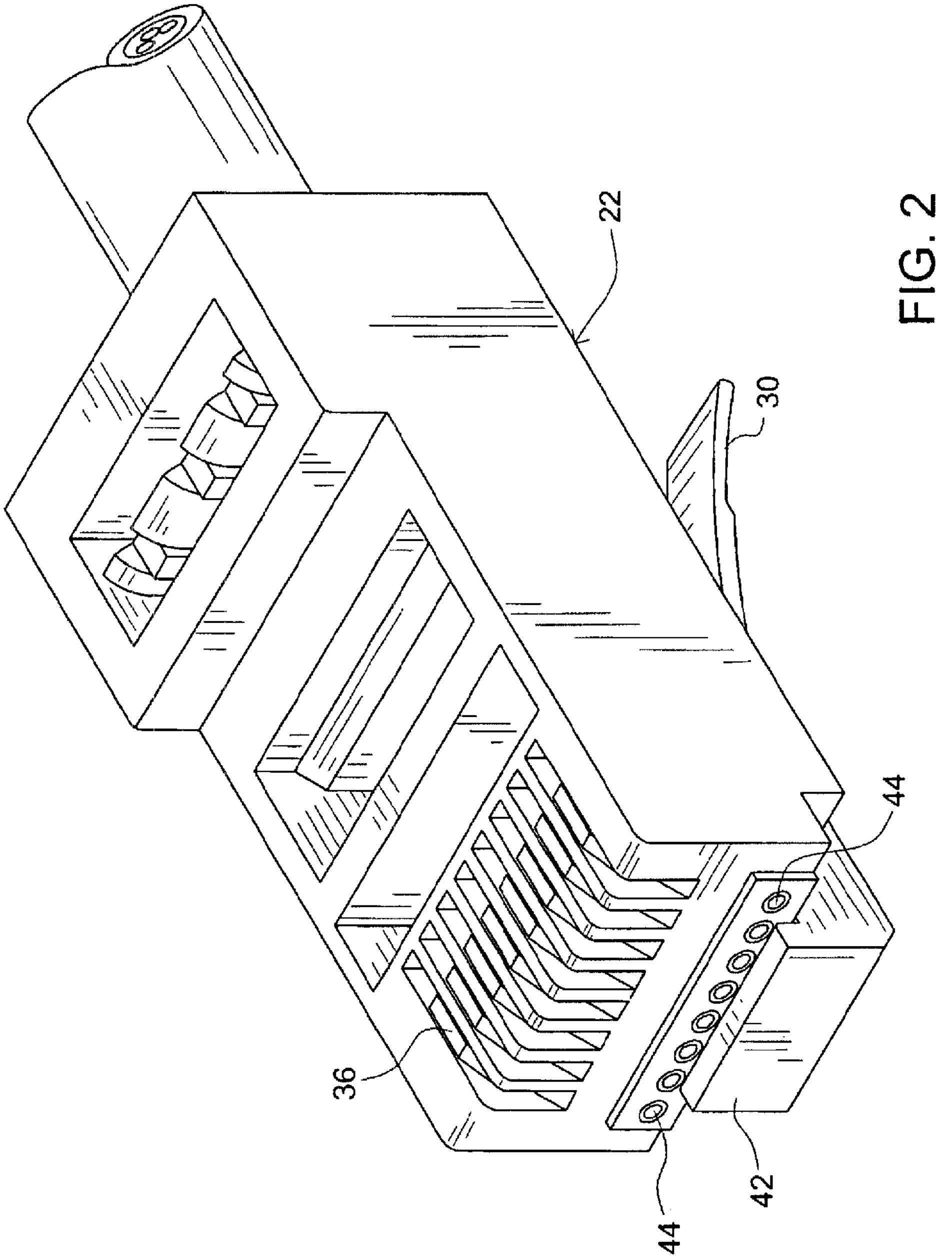
FIG. 2 Prior Art
Figure 3:
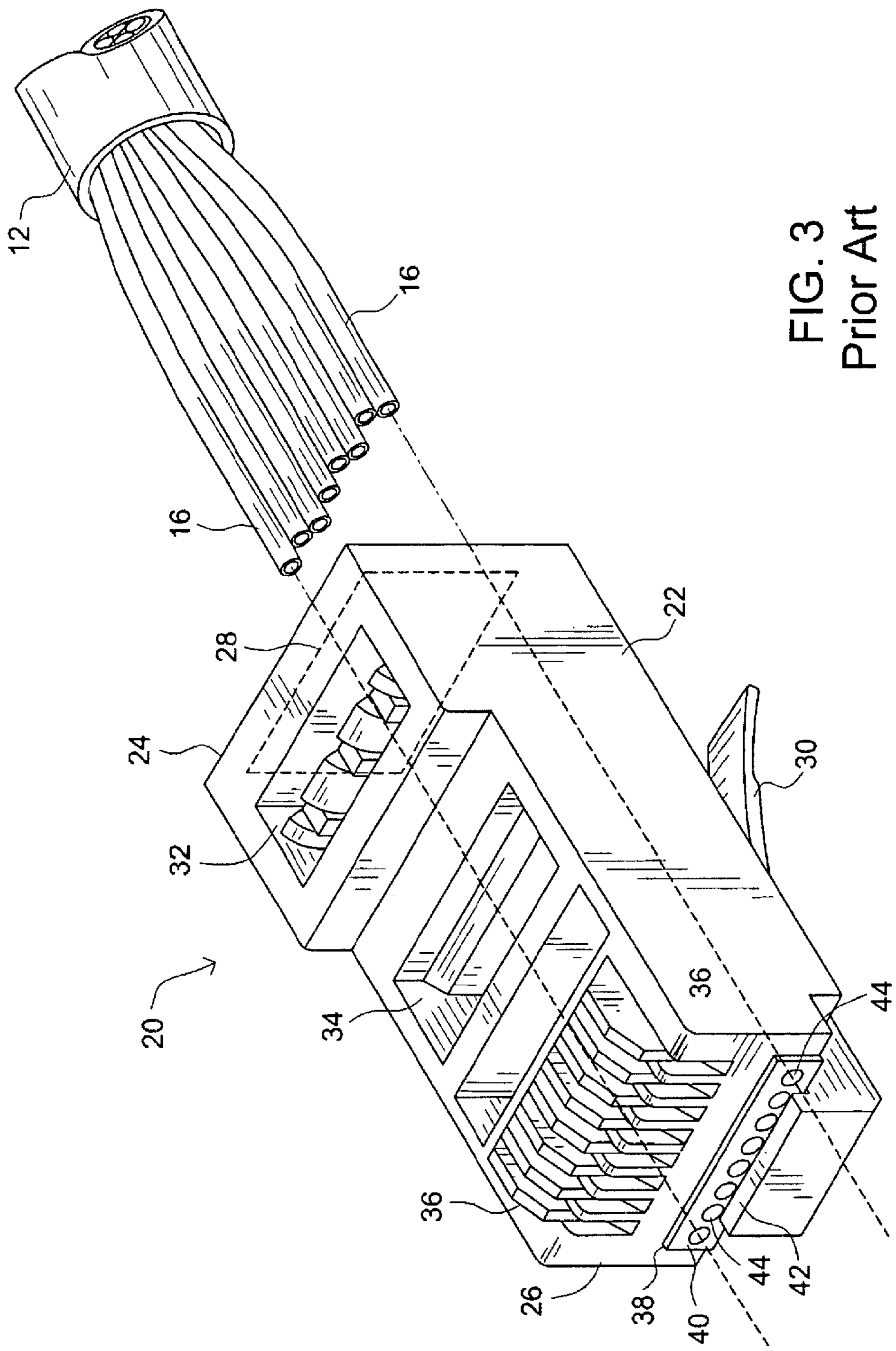
FIG. 3 Prior Art
Figure 4:
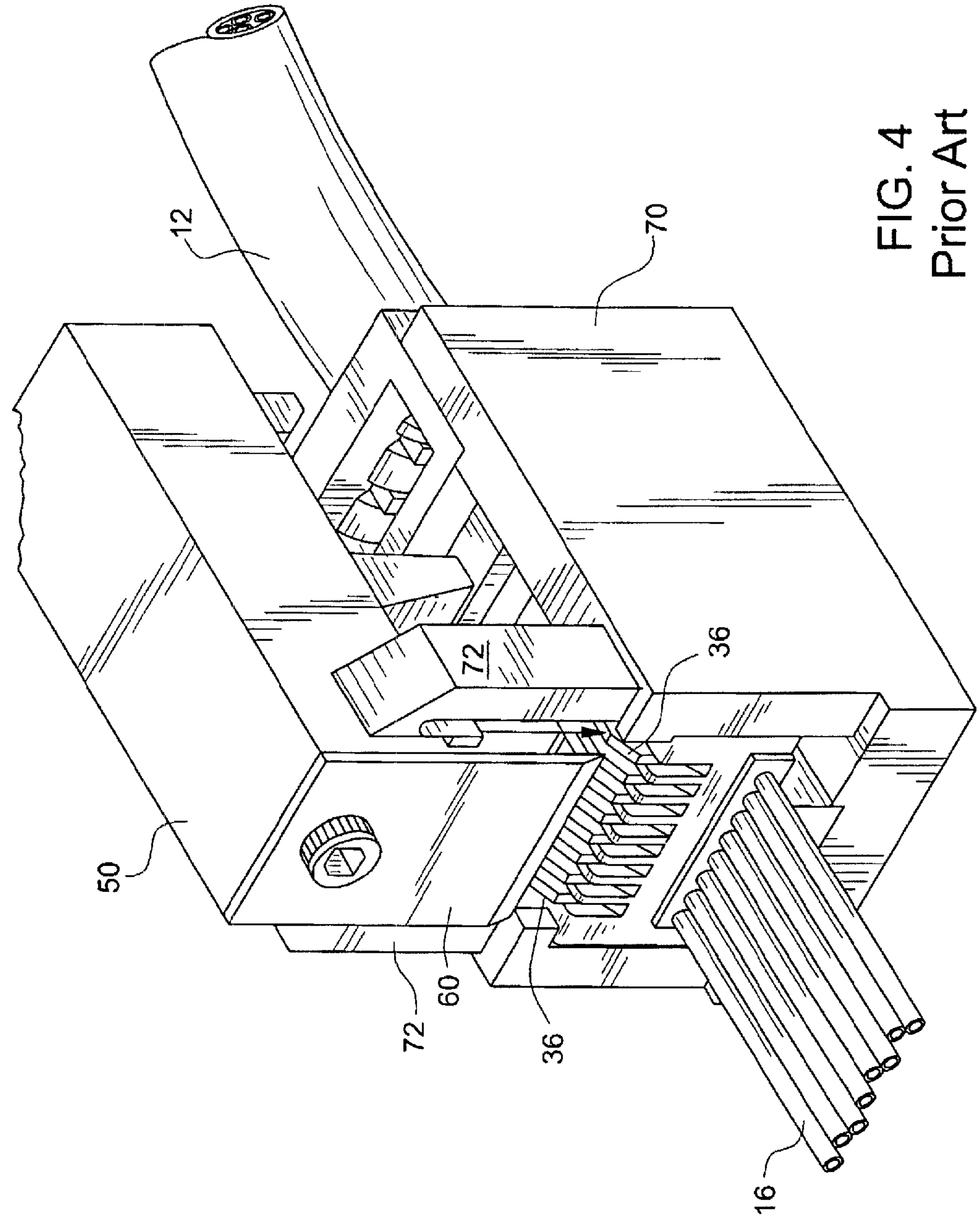
FIG. 4 Prior Art
Figure 5:
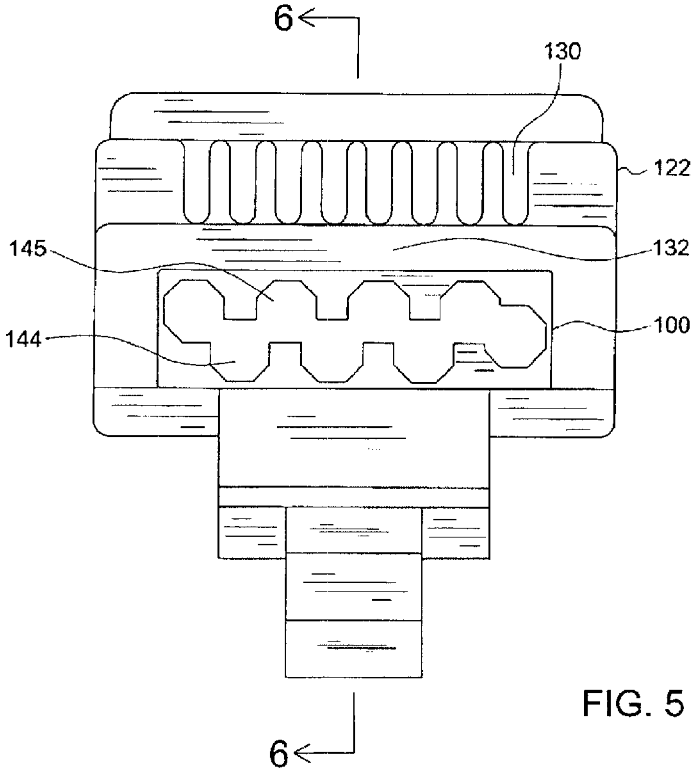
FIG. 5 is a front end elevation view of my modified connector housing and External Load Bar, showing the empty connector not loaded with wires.
Figure 6:
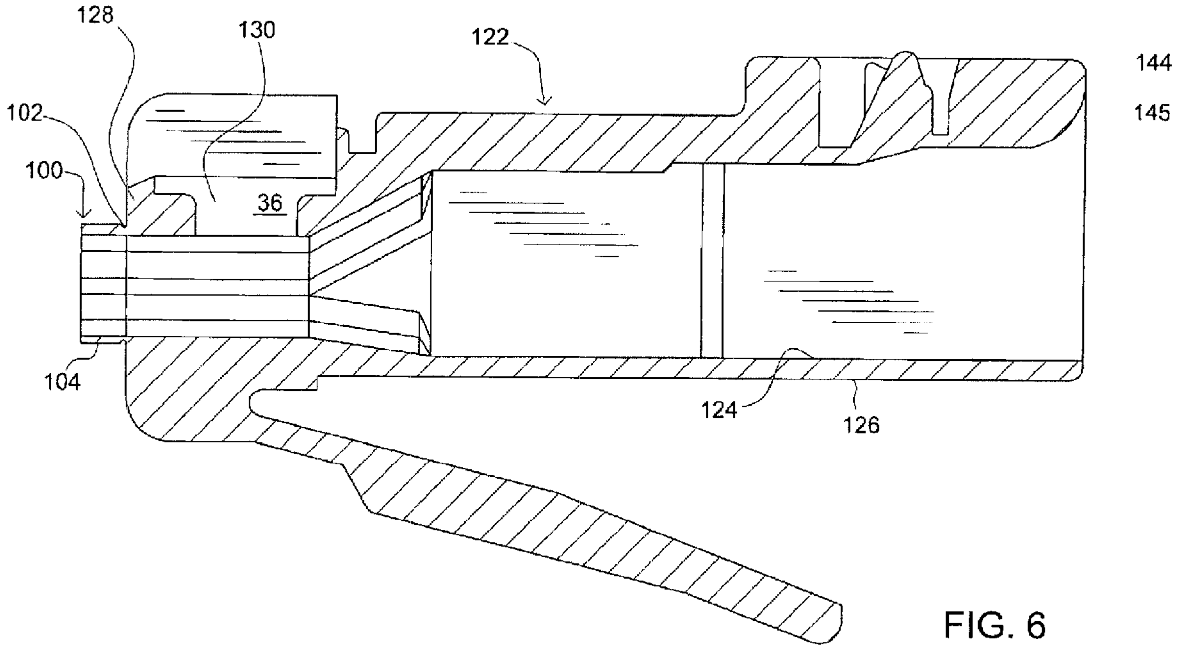
FIG. 6 is an elevational cross-section taken on Line 6-6 of FIG. 5 showing the empty connector housing with the External Load Bar on its forward end wall.

As shown in FIGS. 5 and 6, the modified connector housing 122 has a thickened Stiffener 100 (otherwise known as the External Load Bar) formed as an integral lower part of its front end wall 128. A horizontal row of four upper holes 145 and a horizontal row of four lower holes 144 are formed through the solid material of the Stiffener. As best seen in FIG. 5, the holes of the rows are staggered, and tend to blend or merge together. Stiffener 100 has a flat bottom surface identified by numeral 104. During the shearing operation, stiffener 100 will be supported from that bottom surface 104, which will in turn rest upon an anvil. There is a thin layer of plastic material underneath the lower holes 144, which forms the bottom surface 104.

On the front wall of housing 122 as best seen in FIG. 5, there is an upper vertical area 132, above the Stiffener 100, where the slots or grooves 130 for contact blades 36 are located. There are eight of these slots to accommodate the eight contact plates 36. The cross-section view of FIG. 6 shows one contact blade 36 occupying the corresponding slot or groove 130.

As shown in FIG. 6, the bottom wall of connector housing 122 is designated 124 and its bottom surface as 126. When the connector is loaded with wires, they will be in suitable guideways extending the length of the hollow connector housing, and will also extend through the holes 144, 145, and protrude outward from the front side of the Stiffener 100.

Since FIG. 6 is a cross-section view, it shows one of the contact blades 36 occupying a corresponding one of the slots 130.

As also indicated in FIG. 6, the plastic material of Stiffener 100 is formed integral with front end wall 128 of housing 122. That is extremely important, because when the Stiffener 100 and the encased wires it contains are sheared off, the Stiffener continues to mechanically support the front end wall 128 until the shearing is fully complete.

As shown in FIG. 6, the upper surface of Stiffener 100 has a small groove 102 that is immediately adjacent the flat upper face 132 of the connector housing. The purpose of that groove is to guide the action of cutting blade 60 when the stiffener and wire ends are to be sheared off.

Figure 7:
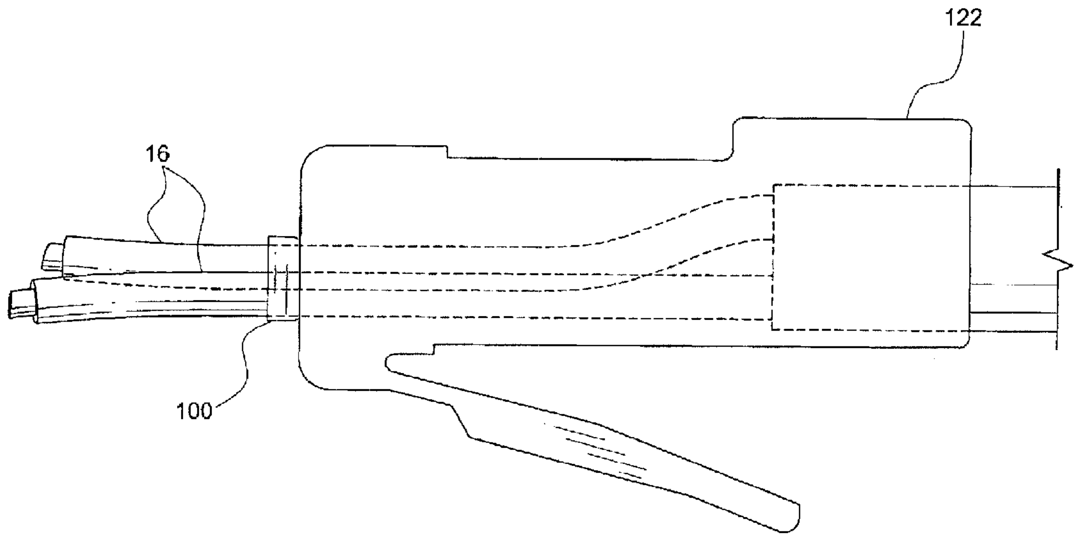
FIG. 7 is a side elevational view of the connector housing loaded with wires.

Reference is now made to FIG. 7 which shows the connector housing when loaded with insulated wires. Wires 16 are unsheathed from an incoming cable with a length sufficient to protrude at least several inches of gripping length from the front side of Stiffener 100. This allows the technician to pull the wires tight before doing the crimping and shearing operation. Tightness of the wires inside the connector housing improves the electrical performance of the connector.

Figure 8:
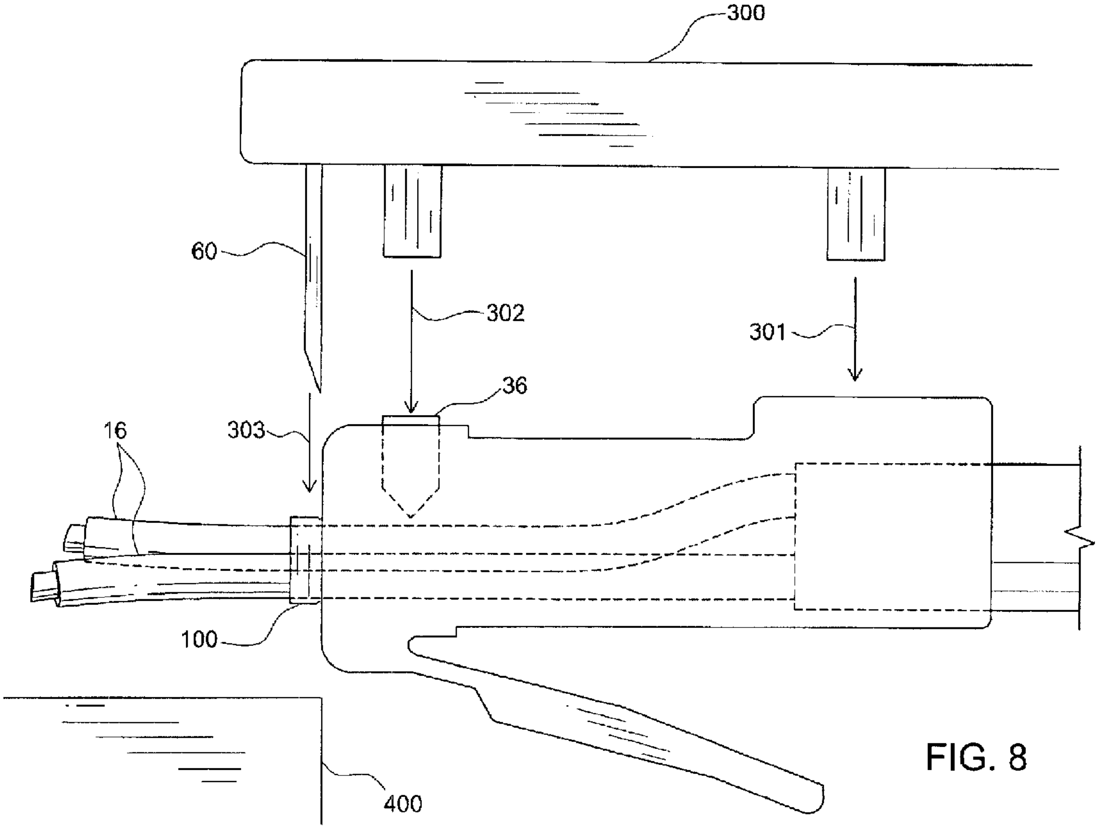
FIG. 8 is a view like FIG. 7, but additionally with schematic indications showing how the crimping and shearing operation, and the separation of the External Load Bar with its encased wires, will be done.

FIG. 8 reproduces the loaded housing of FIG. 7 on a smaller scale, to provide space to schematically illustrate how the crimping and shearing will be done. A hand tool 300 above the housing drives arrows 301, 302, and 303 downward. Arrow 301 represents the crimping of the plastic housing, in the manner shown in my prior patents. Arrow 302 represents the blade driver, that drives all of the blades 36 into electrical engagement with the corresponding contact blades. And arrow 303 represents the cutting blade 60 that will shear off both the Stiffener 100 and its encased wires. A block 400 shown in the lower left corner of the drawing represents an anvil that supports the bottom surface 104 of the Stiffener 100, and that the blade 60 will engage at the end of its cutting stroke.

As shown in FIG. 9, the Stiffener 100 after separation from front wall 128 of the housing still retains its load of insulated wires 16 protruding from its front side. It is then no longer needed, and may be disposed of.

As shown in FIG. 10, removal of the Stiffener 100 has left the bare front wall 128 in which the bared ends of the insulated wires are clearly visible. The wire ends do not and must not protrude, or there would be a risk of electrical engagement with the female connector. To accomplish the appropriate electrical function of the connector, that must not be tolerated. Removal of the Stiffener brings the size and shape of the housing 122 back to the industry and FCC standard, so as to correctly mate with a female RJ45 connector.

Method of Operation

As described above, the modified connector housing of the present invention is made with the Stiffener or External Load Bar as an integrally formed part of it. Four pairs of insulated wires are inserted into and through the housing 122, and through the upper and lower holes 144, 145, in the Stiffener. The manner of guiding the wire pairs is such that one wire of each pair protrudes through an upper hole 145, and the other wire of each pair protrudes through the adjacent lower hole 144.

Before shearing the Stiffener and encased wire ends the technician will check the color coding of the wires to verify their correct locations. He then preferably stretches each of the wire pairs by pulling its protruding ends. The purpose of that is to bring each wire pair, inside the connector, as close as possible to the respectively associated contact blades. This is essential to maximize the electrical performance of the connector.

I have modified my crimping and shearing tool 50, 70, to provide two small posts that extend the ends of anvil 42, so that all eight of the wires will be cut in a single pass of the cutting blade 60. The Stiffener sits directly on the anvil, with no space between its bottom surface and the anvil. There is a measurable thickness of plastic material below the bottom row of holes. When the shearing takes place, the blade 60 first cuts all of the wires in the upper row 145, and then all wires in the lower row 144.

After the shearing is done the Stiffener—which is now detached from the front wall 128—may be disposed of. Connector housing 122 is then moved into mating engagement with an associated female receptacle, bringing the contact prongs of the female receptacle into engagement with the contact blades 36. Performance tests, if necessary or desired, may then be conducted.

Although I have described my invention in detail in order to comply with requirements of the patent laws, it will be understood that the scope of my protection is to be adjudged only in accordance with the appended claims.

What is claimed is:

1. A male electrical connector comprising:

a housing having a front end wall and an open rearward end opposite the front end wall;

a plurality of openings extending through the front end wall;

a plurality of slots in the housing each aligned with a respective opening of the plurality of openings and having a contact blade positioned therein;

a plurality of wires each extending though the open rearward end and a respective opening of the plurality of openings and engaging a respective contact blade; and a cutting surface connected to the front end wall below the plurality of openings, the cutting surface is dimensioned and configured to accommodate two opposing posts of a crimping and shearing tool positioned on opposite sides of the cutting surface in a cutting position;

wherein the posts operate to extend the cutting surface in the cutting position such that when shearing takes place the wires are cut off at the same time;

wherein after the wires are cut the male electrical connector with cutting surface can be moved into a mating engagement with a female electrical connector.

2. The male electrical connector of claim 1, wherein the plurality of openings are arranged in more than one row.

3. The male electrical connector of claim 2, wherein the plurality of openings are arranged into a first row and a second row.

4. The male electrical connector of claim 3, wherein the openings in the first row overlap adjacent openings in the second row.

5. The male electrical connector of claim 1, wherein adjacent openings of the plurality of openings overlap forming a merged opening in the front end wall.

6. A system for forming an electrical connector comprising:

a housing having a front end wall and an open rearward end opposite the front end wall;

a plurality of openings extending through the front end wall;

a plurality of wires each extending though the open rearward end and a respective opening of the plurality of openings;

an extension portion projecting from the front end wall and arranged below the plurality of wires; and a tool having a blade and two opposing posts;

wherein the extension portion is positioned between the two opposing posts and below the blade in a cutting position;

wherein the blade engages the extension portion such that each of the wires extending through the associated opening are cut at the same time;

wherein the extension portion remains connected to the front end wall after the blade engages the surface.

7. The system for forming an electrical connector of claim 6, wherein the plurality of openings are arranged into a first row and a second row.

8. The system for forming an electrical connector of claim 7, wherein the openings in the first row overlap adjacent openings in the second row.

9. The system for forming an electrical connector of claim 6, wherein adjacent openings of the plurality of openings overlap forming a merged opening in the front end wall.

10. The system for forming an electrical connector of claim 6, wherein the two opposing posts extend the extension portion to form a cutting surface.

11. The system for forming an electrical connector of claim 6, further comprising a plurality of slots in the housing each aligned with a respective opening of the plurality of openings and having a contact blade positioned therein.

12. An electrical connector comprising:

a housing having a front end wall and an open rearward end opposite the front end wall;

a plurality of openings extending through the front end wall;

a plurality of wires each extending though the open rearward end and a respective opening of the plurality of openings;

a portion extending away from the front end wall below the plurality of openings, the portion being positioned between two opposing posts of a crimping and shearing tool in a cutting position such that the portion and the two opposing posts act as a surface for cutting off all of the wires extending through the front end wall;

wherein after the wires are cut the electrical connector with the portion can be moved into a mating engagement with a corresponding electrical connector.

13. The electrical connector of claim 12, wherein the plurality of openings are arranged into at least two rows.

14. The electrical connector of claim 13, wherein the plurality of openings are arranged into a first row and a second row.

15. The electrical connector of claim 14, wherein the openings in the first row overlap adjacent openings in the second row.

16. The electrical connector of claim 12, wherein adjacent openings of the plurality of openings overlap forming a merged opening in the front end wall.

17. The electrical connector of claim 12, further comprising a plurality of guides in the housing each aligned with a respective opening of the plurality of openings.

* * * * *